United States Patent Office 3,379,510  
Patented Apr. 23, 1968

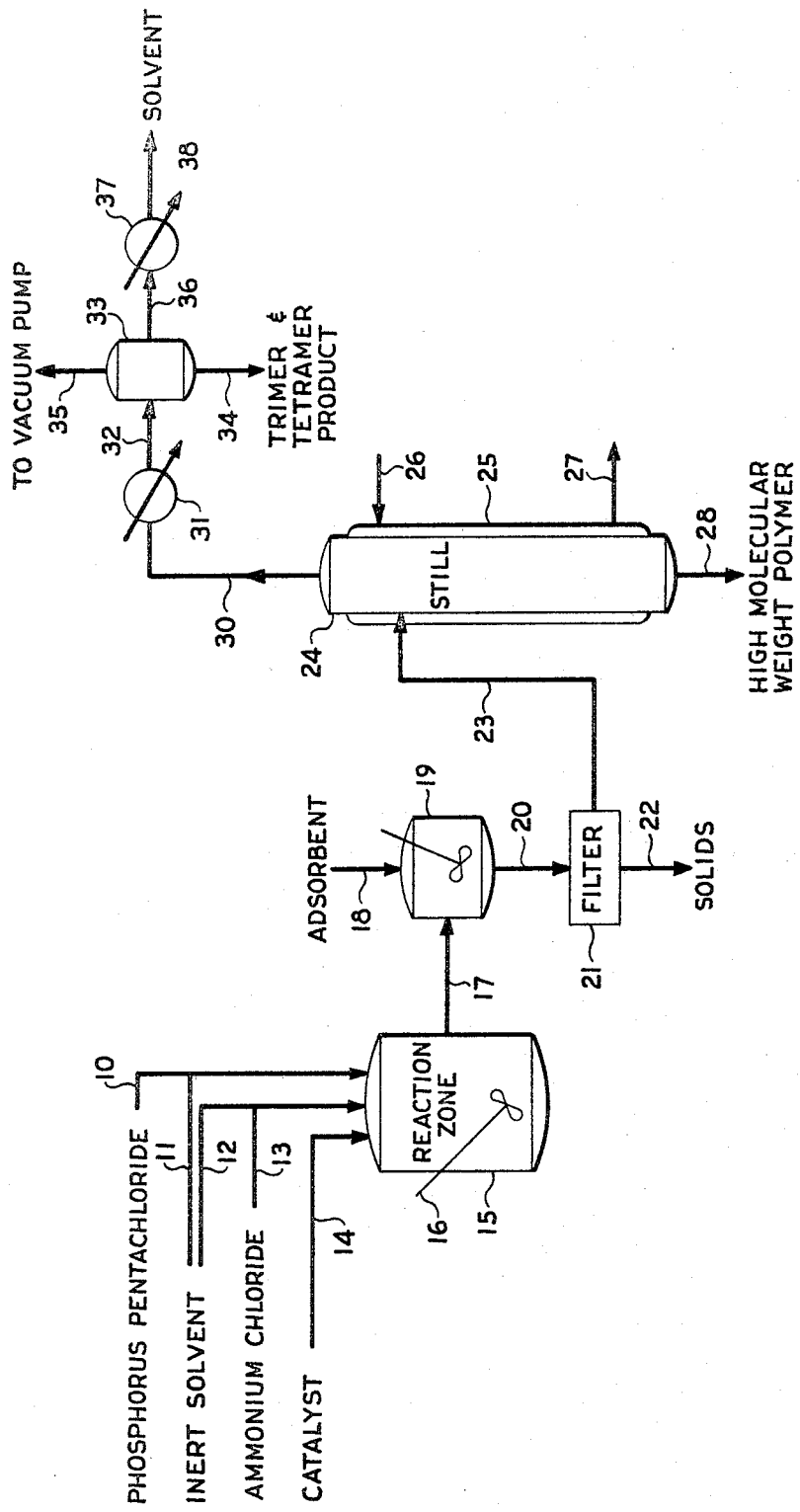

3,379,510  
PHOSPHONITRILIC CHLORIDE PROCESS  
Daniel J. Jaszka, Tonawanda, N.Y., assignor to Hooker Chemical Corporation, Niagara Falls, N.Y., a corporation of New York  
Filed Aug. 14, 1962, Ser. No. 216,892  
11 Claims. (Cl. 23—357)

This invention relates to improvements in a method of manufacture of phosphonitrilic chloride polymers whereby a high proportion of cyclic phosphonitrilic chloride polymers is produced by comparatively simple and inexpensive operation.

The formation of polymeric phosphonitrilic chlorides has been described in "Chemical Review," vol. 32, pp. 111 thru 127 (1943), by Audreith et al. A method described is the refluxing of phosphorus pentachloride and ammonium chloride in an inert solvent. When the reaction has proceeded substantially to completion, a mixture of polymers is obtained. This mixture consists of (a) cyclic phosphonitrilic chloride polymers $(PNCl_2)_n$ where $n$ is an integer of three or more and (b) linear $PNCl_2$ chains end blocked with the elements of phosphorus pentachloride and having the probable formula $(PNCl_2)_n PCl_5$.

Typical proportions, expressed as percentages by weight, of the two types of polymers obtained by this method are 75 to 85% of cyclic polymer and 15 to 25% of linear polymer. Furthermore, the proportions of the individual cyclic polymers found in the crude mixture of cyclic and linear polymers are approximately 30 to 35% of the trimer $(PNCl_2)_3$, 10 to 20% of the tetramer $(PNCl_2)_4$ and 30 to 40% of the higher cyclic polymers, the percentage of various polymers being expressed as percentages by weight. The proportions of the two types of polymers may be varied to some extent by varying the amounts of phosphorus pentachloride and ammonium chloride used.

The trimeric and tetrameric phosphonitrilic chloride polymers are in demand because of their elastic, heat- and fire-resistant qualities for such applications as coatings for ceramics and metals, fireproofing of textiles, additives for increasing heat resistance and as reactants in preparing thermally stable resins. Accordingly, it is necessary to provide suitable methods of recovery of the lower cyclic polymers if their commercial manufacture is to be economically feasible.

I have found a method of beneficiation and upgrading mixtures of phosphonitrilic chloride polymer crudes and a novel distillation technique by which increased yields of trimeric and tetrameric phosphonitrilic chloride crystals are recovered.

Accordingly, it is an object of this invention to provide a simplified, yet inexpensive process for the production of phosphonitrilic chloride polymers assaying high in the trimeric and tetrameric cyclic polymers. A further object of the invention is to provide a method for removing nonpolymeric contaminants from phosphonitrilic chloride polymers. It is still a further object to eliminate the undesirable modification of the trimeric and tetrameric cyclic polymers caused by known methods of purification of the crude polymers. Other objects will become apparent to those skilled in the art upon reference to the following detailed description and examples, reference being had to the accompanying drawing which is a flow sheet of my process for manufacturing phosphonitrilic chlorides.

In accordance with one aspect of this invention there is provided a clarification method which improves color, removes unreacted raw materials, catalysts and miscellaneous contaminants of the reaction, wherein the reaction product is treated with an absorbent medium. This results in the removal of material which could cause further polymerization during the distillation.

The second aspect of this invention provides a novel method for separating cyclic phosphonitrilic chloride trimeric and tetrameric polymers from a liquid mixture of phosphonitrilic chloride polymers and an inert solvent which comprises forming a moving (agitated) film of said liquid mixture, applying heat to said moving film, thereby forming a vapor phase comprising said trimer and tetramer and solvent and a liquid phase comprising higher molecular weight polymers, and separating said vapor and liquid phases. The vapor phase is passed to a cooling zone wherein the polymers are condensed and separated from the solvent vapor.

My invention is shown schematically in the figure. A slurry prepared by mixing ammonium chloride in conduit 13 and solvent in conduit 12 is charged into reaction zone 15, and catalyst is added via conduit 14. Phosphorus pentachloride in conduit 10 is dissolved in hot solvent in conduit 11 and is admitted to the reaction zone 15 provided with agitator 16 to maintain mild agitation. The contents of the reaction zone pass via conduit 17 to a clarification zone 19 wherein absorbent medium is introduced through conduit 18. After clarification, all of the contents are passed through conduit 20 to a filter 21 where the solids are discarded through conduit 22 and the liquid passes via conduit 23 into a still 24 wherein a thin film of liquid is formed on the heated walls. A suitable heating medium such as steam or heated oil is supplied and withdrawn via conduits 26 and 27. The desired vaporized phosphonitrilic chloride polymers and vaporized solvent accumulated in area 25 leave the still through conduit 30, while the high molecular weight polymers continue down to the bottom of the heated walls and are discharged from the still at 28. Thereafter the vapors condense in condenser 31, and the condensate passes through conduit 32 to an evaporator 33 where a vacuum pump 35 is attached. Trimeric and tetrameric phosphonitrilic chloride product is recovered via conduit 34, and the solvent vapor in line 36 may then be recovered by passing it to a condenser 37 and thereafter the recovered solvent 38 is ready for reuse.

The solvent has a boiling point which will allow the reaction of phosphorus pentachloride and ammonium chloride to proceed preferably under reflux conditions, and is inert to the raw materials and reaction products and also is an effective solvent for phosphorus pentachloride. Lastly, the solvent boiling point should be sufficiently low that the solvent may be removed afterwards from the crude phosphonitrilic polymer without further polymerization. I prefer to use monochlorobenzene as the solvent in my invention although other chlorinated hydrocarbon solvents or phosphorus oxychloride may be used. Among the other satisfactory solvents are trichlorobenzenes, orthodichlorobenzene, sym-tetrachloroethane and tetrachloroethylene. Still other useful solvents are benzyl chloride, chloroform and carbon tetrachloride. Monochlorobenzene is a suitable solvent, since it offers a comparatively low boiling point, is economical, less toxic than tetrachloroethane and readily available. The chlorinated hydrocarbon solvent used should, at atmospheric pressure, boil at 100° C. or higher to insure a reasonably rapid reaction rate.

In general, as the temperature is increased up to about 300° C., progressively higher amounts of the higher cyclic phosphonitrilic chloride polymers are formed. I have found it necessary to control the temperature through all steps of the manufacturing process and not just in the first step of forming the crude phosphonitrilic chloride polymers if the objects of this invention are to be achieved. From the table of solvent boiling points below, it will be seen that various reflux temperatures may be obtained by appropriate choice of solvent.

Reaction media: Boiling point, ° centigrade
- Chloroform _____ 61
- Carbon tetrachloride _____ 77
- Phosphorus oxychloride _____ 107
- Tetra-chloroethylene _____ 121
- Mono-chlorobenzene _____ 132
- Sym-tetra-chloroethane _____ 146
- Benzyl chloride _____ 179
- o-Dichlorobenzene _____ 180
- Trichlorobenzenes _____ 208–218

Preferably, the temperature employed during the reaction and clarification steps should be between 100° and 150° centigrade so that the greatest possible amount of trimeric phosphonitrilic chloride may be formed in an economically reasonable period of time.

Contaminants found in the phosphonitrilic chloride crudes may be attributable to impurities found in the reactants and to corrosion products traced to the equipment. The contaminants from whatever source are objectionable since the phosphonitrilic products are discolored and these impurities also promote further polymerization during the later step of distillation.

Recently Paddock and Searle in Canadian Patent 614,267 (1961) have disclosed the use of certain anhydrous metallic salts which are capable of forming a co-ordination complex with ammonia and amines, the object of which is to promote and cause the completion of the reaction between phosphorus pentachloride and ammonium chloride in a materially shorter period of time. Anhydrous metallic salts found suitable for this purpose include cobaltous chloride, aluminum chloride, manganous chloride, cupric chloride, stannic chloride, magnesium chloride, zinc chloride and titanium chloride. It is to these metallic salts the term catalyst hereinafter employed refers.

The absorbent medium of the first aspect of this invention is employed using solvents, pressures and temperatures described above. In one method, the absorbent medium is introduced to the reaction zone after the reaction is completed, and refluxing is continued until the product liquor in the reaction zone is clear. Alternatively, the reaction product is transferred to a separate treatment zone for the clarification step. These methods involving refluxing during the clarification step also serve to liberate residual amounts of hydrochloric acid gas entrapped in the product liquor. In still another method, the product liquor is passed through a fixed bed of the absorbent medium. Suitable absorbent media include absorbent charcoal, silica gel, fuller's earth, acid treated clays, bone char and bauxite. I have found fuller's earth, which has the general composition of aluminum magnesium silicate, most suitable for this purpose. While the product liquor will vary from time to time in the exact amount of phosphonitrilic polymers, reactants and contaminants contained therein, thus requiring some latitude in the amount of absorbent medium used, from 0.1 to 5.0 parts for each 50 parts of product liquor may be employed. Generally, about 1 part for each 50 parts of product liquor is satisfactory.

The clarified product liquor may be separated from the solids contained therein by passing the liquor through a filter. Of the classes of filters, i.e., vacuum, gravity and pressure, vacuum is preferred, although gravity may be used without difficulty. In keeping with good engineering practice filter aids such as diatomaceous earth may be used to increase filtration rate. Conventional filter media are suitable for this process.

From the preceding discussion it becomes clear that to preserve the cyclic phosphonitrilic polymers so carefully prepared, mild conditions for separating the desired trimer and tetramer polymers from the higher cyclic and the linear polymers must be employed. To achieve the mild conditions, the time required for the separation process, in addition to actual temperature and pressure employed must be carefully considered. Since simplicity is one of the keynotes of this invention, a distillation method employing the technique of passing under vacuum thin films of the distillant over a heated surface is employed. Some agitation of a wiping nature is desirable to insure that thin uniform films of distillant are passed over the heated surface, although this same effect may be achieved by use of fine sprays directed at the raised end of a heated surface.

The boiling points of the trimer, tetramer, pentamer, hexamer and heptamer are given below:

Boiling point, ° centigrade
- Trimer _____ 124 at 10 mm., 256 at 760 mm.
- Tetramer _____ 185 at 10 mm., 328 at 760 mm.
- Pentamer _____ 223 at 13 mm.
- Hexamer _____ 261–263 at 13 mm.
- Heptamer _____ 289–294 at 13 mm.

I have found that a distillation temperature from 120° to 260° centigrade at atmospheric pressure may be employed although I prefer to employ temperatures from 195° to 205° C. with reduced pressure. When the distillant is free of contaminants, pressure requirements are less critical and 15 mm. is equally suitable as the 10 mm. pressure indicated in the table above. Inasmuch as the preferred still is of the falling film type, the desired polymers are only momentarily heated to the temperature at which further polymerization can occur.

A suitable embodiment of the falling film principle is a still which operates by allowing the distillate to pass as a thin film on to the walls of a heated polished metal cylinder that is stationed within a concentric cooled condensing cylinder. The space between the two is maintained under vacuum by fast pumps. The distillate is collected at the bottom.

The following example is illustrative of the methods of the invention, but is not intended to limit the invention.

Preparation

A hot solution of 370 parts $PCl_5$ (1.78 moles) in 630.6 parts of monochlorobenzene was added slowly over a three hour period to a refluxing and stirred slurry containing 105 parts finely divided $NH_4Cl$ (1.97 moles), 2.3 parts $COCl_2$ and 432.4 parts of monochlorobenzene. (Finely divided $NH_4Cl$ was prepared by ball-milling in 432.4 parts of solvent for 19 hours.) An additional hour of reaction time was required after the addition to allow for completeness of reaction as evidenced by the evolution of hydrogen chloride. A control portion of the mixture was filtered and the monochlorobenzene distilled off at reduced pressure to yield crude phosphonitrilic chloride product. Analysis by infrared and petroleum ether extraction show the product to be 1% linear polymer, 64% trimer, 15% tetramer and 20% higher cyclics by difference.

Pre-treatment 2080 parts of product liquor, which was brown and contained finely divided catalyst, ammonium chloride and hydrogen chloride were refluxed at atmospheric pressure for one hour with 42 parts of dry fuller's earth. Attapulgus brand was the commercial embodiment of fuller's earth used. When filtered a clear yellow solution was obtained having a color of Gardner Number 2.

Purification and recovery

Part of the above pretreated solution (603 parts) which contained 21% trimer and 6.4% tetramer was fed at a rate of 14 parts/min. to a falling agitated film distillation unit controlled at 200° C. and a vacuum of 15 mm. Distillate (563 parts) and brown crystalline bottoms (27 parts) were collected. Distilling off the monochlorobenzene produced a white non-fuming crystalline phosphonitrilic product (143 parts), analyzing 84% trimer and 13% tetramer and possessing an odor similar to camphor. Distillation yield calculates to approximately 80% based on contained total crude product in the solvent.

Various changes and modifications may be made in the method and apparatus of this invention, certain preferred forms of which have been herein described without departing from the spirit and scope of this invention. These modifications of this basic invention are to be regarded as within the scope and purview of this invention.

I claim:

1. The method for separating cyclic phosphonitrilic chloride trimer and tetramer from a liquid mixture of phosphonitrilic chloride polymers and an inert solvent selected from the group consisting of halogenated hydrocarbons and phosphorus oxychloride which comprises (1) forming a moving agitated film of said liquid mixture, (2) applying heat to said moving film, said heat being applied in an amount sufficient to form (a) a vapor phase comprising said trimer, tetramer and solvent and (b) a liquid phase comprising higher molecular weight polymers, said heat being applied in an amount sufficient to vaporize a substantial amount of said liquid phase, and (3) separating said vapor and liquid phases.

2. The method of claim 1 wherein the vapor phase is passed to a cooling zone wherein the polymers are condensed and separated from the solvent vapor, and thereafter said solvent vapor is condensed.

3. The method for the preparation of mixtures of cyclic phosphonitrilic chloride trimer and tetramer which comprises (1) reacting phosphorus pentachloride with ammonium chloride in the presence of an inert solvent selected from the group consisting of halogenated hydrocarbons and phosphorus oxychloride, (2) forming a moving agitated film of the resulting product liquor, (3) heating said moving film, said heat being applied in an amount sufficient to form (a) a vapor phase comprising said trimer, tetramer and solvent and (b) a liquid phase comprising higher molecular weight phosphonitrilic chloride polymers, said heat being applied in amount sufficient to vaporize a substantial amount of said liquid phase, (4) separating said vapor and liquid phase, (5) passing said vapor phase to a cooling zone (6) condensing and separating the polymers from the solvent vapor, and (7) thereafter condensing the solvent vapor.

4. The method for the preparation of mixtures of cyclic phosphonitrilic chloride trimer and tetramer which comprises (1) reacting phosphorus pentachloride with ammonium chloride in the presence of an inert solvent selected from the group consisting of halogenated hydrocarbons and phosphorus oxychloride, clarifying the resulting product liquor by treatment with an absorbent medium, forming a moving agitated film of the resulting treated liquor, (2) heating said moving film, said heat being applied in an amount sufficiently to form (a) a vapor phase comprising said trimer, tetramer and (b) solvent and a liquid phase comprising higher molecular weight phosphonitrilic chloride polymers, said heat being applied in an amount sufficient to vaporize a substantial amount of said liquid phase, (3) separating said vapor and liquid phases, (4) passing said vapor phase to a cooling zone, (5) condensing and separating said trimer and tetramer polymers from the solvent in said vapor phase, and (6) thereafter condensing the solvent vapor.

5. The method for preparing substantially pure cyclic phosphonitrilic chloride trimer and tetramer of the formula $(PNCl_2)_n$ where $n$ is an integer from three to four, which comprises (1) slowly adding a solution of phosphorus pentachloride dissolved in hot solvent selected from the group consisting of halogenated hydrocarbons and phosphorus oxychloride to a slurry of ammonium chloride in said inert solvent under reflux conditions, (2) thereafter reacting under said reflux conditions until said reaction has proceeded substantially to completion, (3) subsequently clarifying the product liquor by the addition of an absorbent medium to said liquor followed by filtration of the absorbent medium from said liquor, (4) thereafter forming a moving agitated film of said liquid mixture, (5) applying heat to said moving film thereby forming a vapor phase comprising said trimer, tetramer and solvent and a liquid phase comprising higher molecular weight polymers and separating out said vapor and liquid phase, said heat being applied in an amount sufficiently to form a vapor phase comprising said trimer, tetramer and solvent and insufficient to form a vapor phase of substantially higher molecular weight phosphonitrilic chloride polymers in said moving film, (6) passing said vapor phase to a cooling zone, condensing and separating the polymers from the solvent in said vapor phase.

6. The method according to claim 5 wherein the absorbent medium is employed under refluxing conditions.

7. The method according to claim 5 wherein the absorbent medium is fuller's earth, wherein said solvent is selected from the group consisting of chloroform, phosphorus oxychloride, tetra-chloroethylene, monochlorobenzene, sym-tetra-chloroethane, benzyl chloride, o-dichlorobenzene, trichlorobenzenes, and mixtures thereof.

8. The method according to claim 5 wherein the distillation is performed employing temperatures between 120° and 260° centigrade.

9. The method according to claim 5 wherein the inert solvent is a chlorinated hydrocarbon having a boiling point in excess of 100° centigrade.

10. The method according to claim 5 wherein the inert solvent is monochlorobenzene.

11. The method according to claim 5 wherein a catalyst is employed to promote the reaction between phosphorus pentachloride and ammonium chloride.

References Cited

UNITED STATES PATENTS

| 2,207,597 | 7/1940 | Pechukas | 203—41 |
| 2,609,334 | 9/1952 | Pyle et al. | 203—89 XR |

FOREIGN PATENTS

| 1,220,716 | 1/1960 | France. |
| 905,315 | 9/1962 | Great Britain. |

OTHER REFERENCES

Mellor: "Comprehensive Treatise on Theoretical and Inorganic Chemistry," 1928, vol. (VIII), pp. 721–724.

MILTON WEISSMAN, *Primary Examiner.*